United States Patent
Hartz et al.

(10) Patent No.: US 12,131,065 B2
(45) Date of Patent: Oct. 29, 2024

(54) MEMORY DEVICE OVERHEAD REDUCTION USING ARTIFICIAL INTELLIGENCE

(71) Applicant: Micron Technology, Inc., Boise, ID (US)

(72) Inventors: Ezra E. Hartz, Meridian, ID (US); Benjamin Rivera, Boise, ID (US); Joseph A. De La Cerda, Boise, ID (US); Bruce J. Ford, Meridian, ID (US); Nicolas Soberanes, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 129 days.

(21) Appl. No.: 17/407,015

(22) Filed: Aug. 19, 2021

(65) Prior Publication Data
US 2023/0058282 A1     Feb. 23, 2023

(51) Int. Cl.
*G06F 3/06*     (2006.01)
*G06N 3/04*     (2023.01)

(52) U.S. Cl.
CPC .......... *G06F 3/0659* (2013.01); *G06F 3/0604* (2013.01); *G06F 3/0619* (2013.01); *G06F 3/064* (2013.01); *G06F 3/0652* (2013.01); *G06F 3/067* (2013.01); *G06N 3/04* (2013.01)

(58) Field of Classification Search
CPC .... G06F 3/0659; G06F 3/0604; G06F 3/0619; G06F 3/064; G06F 3/0652; G06F 3/067; G06N 3/04
See application file for complete search history.

(56) References Cited

U.S. PATENT DOCUMENTS

| | | | |
|---|---|---|---|
| 8,572,411 B2 | 10/2013 | Ginter et al. | |
| 8,880,775 B2 | 11/2014 | Stefanus et al. | |
| 9,229,854 B1* | 1/2016 | Kuzmin | G06F 3/0679 |
| 9,646,067 B2 | 5/2017 | Abercrombie et al. | |
| 10,043,035 B2 | 8/2018 | LaFever et al. | |
| 10,182,073 B2 | 1/2019 | Redlich et al. | |
| 10,976,962 B2 | 4/2021 | Karumbunathan et al. | |
| 11,146,472 B1* | 10/2021 | Sinks | H04L 41/16 |
| 2009/0132621 A1* | 5/2009 | Jensen | G06F 3/0673 |
| 2014/0344216 A1 | 11/2014 | Abercrombie et al. | |
| 2018/0330238 A1 | 11/2018 | Luciw et al. | |
| 2018/0357246 A1* | 12/2018 | Strogov | G06F 16/113 |
| 2019/0260784 A1 | 8/2019 | Stockdale et al. | |
| 2019/0377494 A1* | 12/2019 | Rao | G06F 12/0246 |
| 2021/0136150 A1* | 5/2021 | Zhang | H04L 67/1097 |

FOREIGN PATENT DOCUMENTS

JP     4008937     11/2007

\* cited by examiner

*Primary Examiner* — Jason W Blust
(74) *Attorney, Agent, or Firm* — Brooks, Cameron & Huebsch, PLLC

(57) ABSTRACT

Apparatuses and methods can be related to reducing memory device overhead using artificial intelligence (AI). Reducing overhead can include receiving file metadata of a data file and device metadata of the memory device. Based on the file metadata and the device metadata, a number of indicators can be selected to provide an indication of an expected use of the data file in the memory device. The number of indicators can be provided to the memory device. The data file can be stored with different data files having matching indicators corresponding thereto.

19 Claims, 9 Drawing Sheets

MEMORY DEVICE OVERHEAD REDUCTION USING ARTIFICIAL INTELLIGENCE

TECHNICAL FIELD

The present disclosure relates generally to electronic memory apparatuses and methods, and more particularly to apparatuses and methods associated with reducing memory device overhead using artificial intelligence (AI).

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

DETAILED DESCRIPTION

Figure 1:
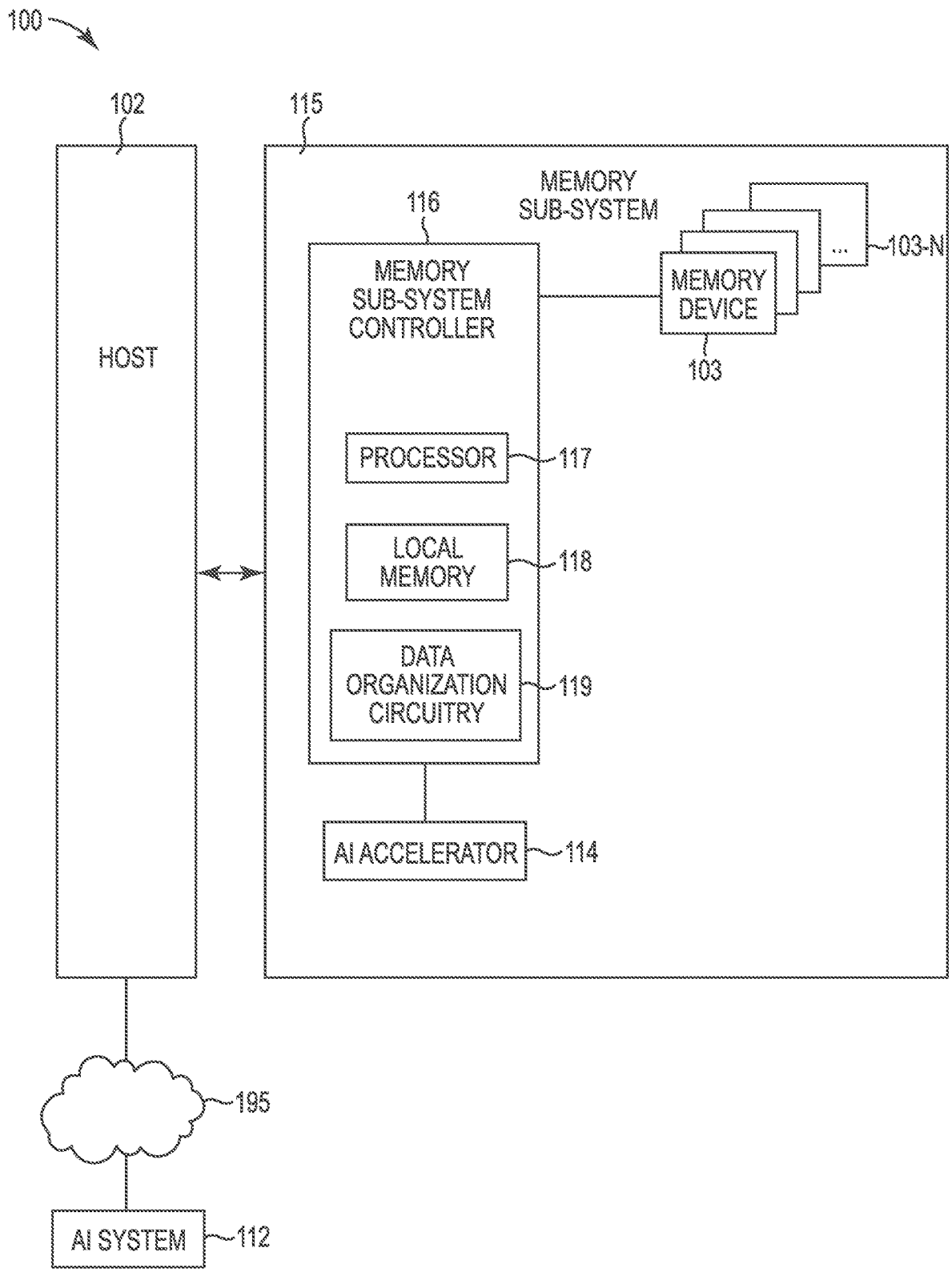
FIG. 1 is a block diagram of an apparatus in the form of a computing system including a memory sub-system in accordance with a number of embodiments of the present disclosure.

The present disclosure includes apparatuses and methods related to reducing memory device overhead using artificial intelligence (AI). Memory device overhead can include the resources of the memory device utilize to perform specific tasks by the memory device. For example, an overhead of the memory device can include the resources utilized to store memory in a memory cells of the memory device. Memory device overhead can include the resources utilized to perform garbage collection and resources utilized to determine whether to utilize memory cells of the memory device as single level cells (SLC), triple level cells (TLC), quad level cells (QLC), among other instances of memory overhead.

Garbage collection is a form of automatic memory management. Garbage collection reclaims memory occupied by objects that are no longer in use. Reclaiming memory, utilizing garbage collection, allows for the reclaimed memory to be available to store additional data whereas the memory prior to being reclaimed is not available to store additional data.

Garbage collection can free programs from performing memory deallocation. Garbage collection can be performed to eliminate dangling pointers and memory leaks, among other examples of problems associated with deallocating memory. Performing garbage collection can cause a drop in performance of a memory sub-system.

Other types of loads (e.g., memory overhead) on the memory sub-system can also benefit from data organization. For example, performing read recovery can also cause a load on the memory sub-system such that performance of the memory sub-system suffers. Read recovery can include operations performed to recover data from a memory sub-system. For example, read recovery operations can include operation to reprogram memory cells of the memory sub-system.

Memory overhead can not only cause a decrease in performance of the memory sub-system but can also cause a reduction in the life of the memory sub-system. Memory overhead can also affect power resources of the memory sub-system. For example, performing garbage collection operations and read recovery operations can cause a power overhead on the memory sub-system.

Aspects of the present disclosure address the above and other deficiencies. In a number of examples, a data use rating can be generated, by an artificial intelligence (AI) system, for a data file. The data use rating, which can also be referred to as an indicator, can be used by a memory sub-system to organize the storage of data in a number of memory devices of the memory sub-system. The AI systems can generate the data use rating based on metadata of the data (e.g., data file) and/or metadata of the memory sub-system. For example, the AI system can generate the data use rating based on a use case of the memory sub-system, the data type of the data file, and/or an expected use of the data in a particular memory sub-system.

The data file and the data use rating can be provided to the memory sub-system. The memory sub-system can organize a storage of data files based on the data use rating. For example, the memory sub-system can segment data files including the data file with data files having like data use ratings. For example, the data file can be stored in a same block as is used to store different data files that have a same data use rating. Data files can have a same data use rating if, for example, the data files expire at substantially the same time and/or the data files are used/read at a same interval. By storing the data file with data files that have a same data use rating, the memory sub-system can perform overhead operations (e.g., garbage collection operations and read recovery operations, among others) on the block of the memory sub-system at a same time instead of performing multiple overhead operations. As used herein, overhead operations include operations that utilize resources of the memory sub-system to perform a specific task such as storing data in memory cells of the memory sub-system.

Performing overhead operations on a block storing the data file and the different data files can increase performance of the memory sub-system, can increase a life span of the memory sub-system, and/or can provide for power efficiencies of the memory sub-system as compared to examples where multiple instances of overhead operations are performed on the data file and the data files stored in a plurality of blocks of the memory sub-system.

As used herein, AI refers to the ability to improve a machine through "learning" such as by storing patterns and/or examples which can be utilized to take actions at a later time. Machine learning refers to a device's ability to learn from data provided as examples. Machine learning can be a subset of AI. As used herein, an artificial neural network (ANN) can provide learning by forming probability weight associations between an input and an output. The probability weight associations can be provided by a plurality of nodes that comprise the ANN. The nodes together with weights, biases, and activation functions can be used to generate an output of the ANN based on the input to the ANN. An ANN can utilize a number of inputs to generate a data use rating (e.g., indicator).

In various examples, the AI system can be implemented in a cloud system. The AI system can be coupled to a host through the cloud system. The host can be coupled to the memory sub-system. New commands can be generated provide the data use rating from the AI system to the memory sub-system via the host. The new commands can be utilized to provide the use case of the memory sub-system, the data type of the data file, and/or an expected use of the data in a particular memory sub-system, for example. The new commands would allow input from the host into the memory sub-system for data sets returned from the AI system so that the memory sub-system can optimized its operation based on returned feedback data from the AI system. Although the examples herein are provided in terms of garbage collection, the examples described herein can also apply to other overhead operations other than garbage collection.

The figures herein follow a numbering convention in which the first digit or digits correspond to the drawing figure number and the remaining digits identify an element or component in the drawing. Similar elements or components between different figures may be identified by the use of similar digits. For example, 112 may reference element "12" in FIG. 1, and a similar element may be referenced as 212 in FIG. 2. Analogous elements within a Figure may be referenced with a hyphen and extra numeral or letter. See, for example, elements 103-1, . . . , 103-N in FIG. 1. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an apparatus in the form of a computing system 100 including a memory sub-system 115 in accordance with a number of embodiments of the present disclosure. As used herein, the memory system 115, the AI accelerator 114, and the memory device 103-1 to 103-N, and/or the host 102, for example, might also be separately considered an "apparatus."

The memory sub-system 115 can include media, such as volatile memory devices and/or non-volatile memory devices (e.g., memory device 103-1 to 103-N). The memory devices 103-1 to 103-N can be referred to as memory devices 103.

A memory sub-system 115 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a desktop computer, laptop computer, network server, mobile device, a vehicle (e.g., automobile, airplane, drone, train, or other conveyance), Internet of Things (IoT) enabled device, embedded computer (e.g., one included in a vehicle, industrial equipment, or a networked commercial device), or such computing device that includes memory and a processing device (e.g., a processor).

The computing system 100 can include a host system 102 that is coupled to one or more memory sub-systems 115. In some embodiments, the host system 102 is coupled to different types of memory sub-systems 115. FIG. 1 illustrates an example of a host system 102 coupled to one memory sub-system 115. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 102 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 102 uses the memory sub-system 115, for example, to write data to the memory sub-system 115 and read data from the memory sub-system 115.

The host system 102 can be coupled to the memory sub-system 115 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 115. The host system 102 can further utilize an NVM Express (NVMe) interface to access components (e.g., memory devices 103) when the memory sub-system 115 is coupled with the host system 102 by the PCIe interface. The physical host interface can provide an interface for passing control, address, data, and other signals between the memory sub-system 115 and the host system 102. FIG. 1 illustrates a memory sub-system 115 as an example. In general, the host system 102 can access multiple memory sub-systems via a same communication connection, multiple separate communication connections, and/or a combination of communication connections.

The memory devices 103 can include various combinations of the different types of non-volatile memory devices and/or volatile memory devices. The volatile memory devices can be, but are not limited to, random access memory (RAM), such as dynamic random access memory (DRAM) and synchronous dynamic random access memory (SDRAM).

Some examples of non-volatile memory devices (e.g., memory device 103) include NAND type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 103 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 103 can include one or more arrays of memory cells such as SLCs, MLCs, TLCs, QLCs, PLCs, or any combination of such. In some embodiments, a particular memory device can include an SLC portion, and an MLC portion, a TLC portion, a QLC portion, or a PLC portion of memory cells. The memory cells of the memory devices 103 can be grouped as pages that can refer to a logical unit of the memory device used to store data. With some types of memory (e.g., NAND), pages can be grouped to form blocks.

Although non-volatile memory devices such as 3D cross-point array of non-volatile memory cells and NAND type memory (e.g., 2D NAND, 3D NAND) are described, the memory devices 103 can be based on various other types of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-OR (NOR) flash memory, and electrically erasable programmable read-only memory (EEPROM).

A memory sub-system controller 116 (or controller 116 for simplicity) can communicate with the memory devices 103 to perform operations such as reading data, writing data, or erasing data at the memory devices 103 and other such operations. The memory sub-system controller 116 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 116 can be a microcontroller, special purpose logic circuitry (e.g., a field programmable gate array (FPGA), an application specific integrated circuit (ASIC), etc.), or other suitable processor.

The memory sub-system controller 116 can include processing device such as a processor 117 configured to execute instructions stored in a local memory 118. In the illustrated example, the local memory 118 of the memory sub-system controller 116 includes an embedded memory configured to store instructions for performing various processes, operations, logic flows, and routines that control operation of the memory sub-system 115, including handling communications between the memory sub-system 115 and the host system 102.

In some embodiments, the local memory 118 can include memory registers storing memory pointers, fetched data, etc. The local memory 118 can also include read-only memory (ROM) for storing micro-code, for example. While the example memory sub-system 115 in FIG. 1 has been illustrated as including the memory sub-system controller 116, in another embodiment of the present disclosure, a memory sub-system 115 does not include a memory sub-system controller 116, and can instead rely upon external control (e.g., provided by an external host, or by a processor or controller separate from the memory sub-system).

In general, the memory sub-system controller 116 can receive commands or operations from the host system 102 and can convert the commands or operations into instructions or appropriate commands to achieve the desired access to the memory devices 103. The memory sub-system controller 116 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 103. The memory sub-system controller 116 can further include host interface circuitry to communicate with the host system 102 via the physical host interface. The host interface circuitry can convert the commands received from the host system into command instructions to access the memory devices 103 as well as convert responses associated with the memory devices 103 into information for the host system 102.

The memory sub-system 115 can also include additional circuitry or components that are not illustrated. In some embodiments, the memory sub-system 115 can include a cache or buffer (e.g., DRAM) and address circuitry (e.g., a row decoder and a column decoder) that can receive an address from the memory sub-system controller 116 and decode the address to access the memory devices 103.

In some embodiments, the memory devices 130 include a local media controller that operates in conjunction with memory sub-system controller 116 to execute operations on one or more memory cells of the memory devices 103. An external controller (e.g., memory sub-system controller 116) can externally manage the memory devices 103 (e.g., perform media management operations on the memory devices). In some embodiments, memory devices 103 are managed memory devices, which are raw memory devices combined with local controllers for media management within the same memory device package. An example of a managed memory device is a managed NAND (MNAND) device.

The memory sub-system controller 116 is coupled to the AI accelerator 114. The AI accelerator 114 can comprise hardware and/or firmware. The AI accelerator 114 can comprise various circuitry (e.g., hardware) such as one or more processing devices (e.g., microprocessors) such as a graphic processing unit (GPU), an application specific integrated circuit (ASIC), or a field-programmable gate array (FPGA), for example. The processors of the AI accelerator 114 can perform low-precision arithmetic operations. The AI accelerator 114 can be implemented using phase-change memory, for example. The processors of the AI accelerator 114 can be memory cells of a memory array. The memory cells can be used to perform matrix multiplication, for example. The memory cells can be configured to perform operations by controlling the resistance of the memory cells. The memory cells can be used to perform operations in parallel. In various examples, the AI accelerator 114 can implement processors that are separate from the memory cells of a memory array.

The AI accelerator 114 can be a deep learning accelerator (DLA), for example. The AI accelerator can be implemented on an edge of the memory system 115. For example, the AI accelerator 114 can be implemented external to the memory devices 103. The AI accelerator 114 can be coupled to an output path that couples the memory devices 103 to the I/O circuitry of the memory sub-system 115.

The memory sub-system controller 116 can control the AI accelerator 114. For example, the memory sub-system controller 116 can provide data to the AI accelerator 114 and can receive outputs from the AI accelerator. The input to the AI accelerator 114 can be provided as input to an ANN which is hosted by the AI accelerator 114. The memory sub-system controller 116 can also cause the output of the AI accelerator 114 and/or the ANN to be provided to the memory devices 103 and/or the host system 102.

The memory sub-system controller 116 can also include data organization circuitry 119. The data organization circuitry 119 can be configured to manage the output of the AI accelerator 114 to provide data use ratings and data files to the memory devices 103. The data organization circuitry 119 can also be configured to provide inputs to the AI accelerator 114. For instance, the data organization circuitry 119 can provide file metadata and device metadata to the AI accelerator 114. As used herein, file metadata is data that describes a data file. Device metadata is data that describes the memory sub-system 115 and/or the memory devices 103. The data organization circuitry 119 can also be configured to perform additional processing on the input to the AI accelerator 114 and/or the output of the AI accelerator 114, as needed.

The AI accelerator 114 can be configured to output a data use rating for a particular data file. For example, an input, including the file metadata and the device metadata, can be provided to an ANN hosted by the AI accelerator 114. The ANN can output a corresponding data use rating. The AI accelerator 114 can provide the data use rating to the data organization circuitry 119. The data organization circuitry 119 can be configured to provide the data file and the data use rating to the memory devices 103. The memory devices 103 can store the data file in view of the data use rating. For example, the memory devices 103 can store the data file with other data files that share the data use rating in a block of at least one of the memory devices 103.

The computing system 100 can be coupled to a cloud system via a network 195. The cloud system can include an AI system 112. The AI system 112 can be, for example, an ANN. The host system 102 can couple the computing system 100 to the network 195.

Figure 2:
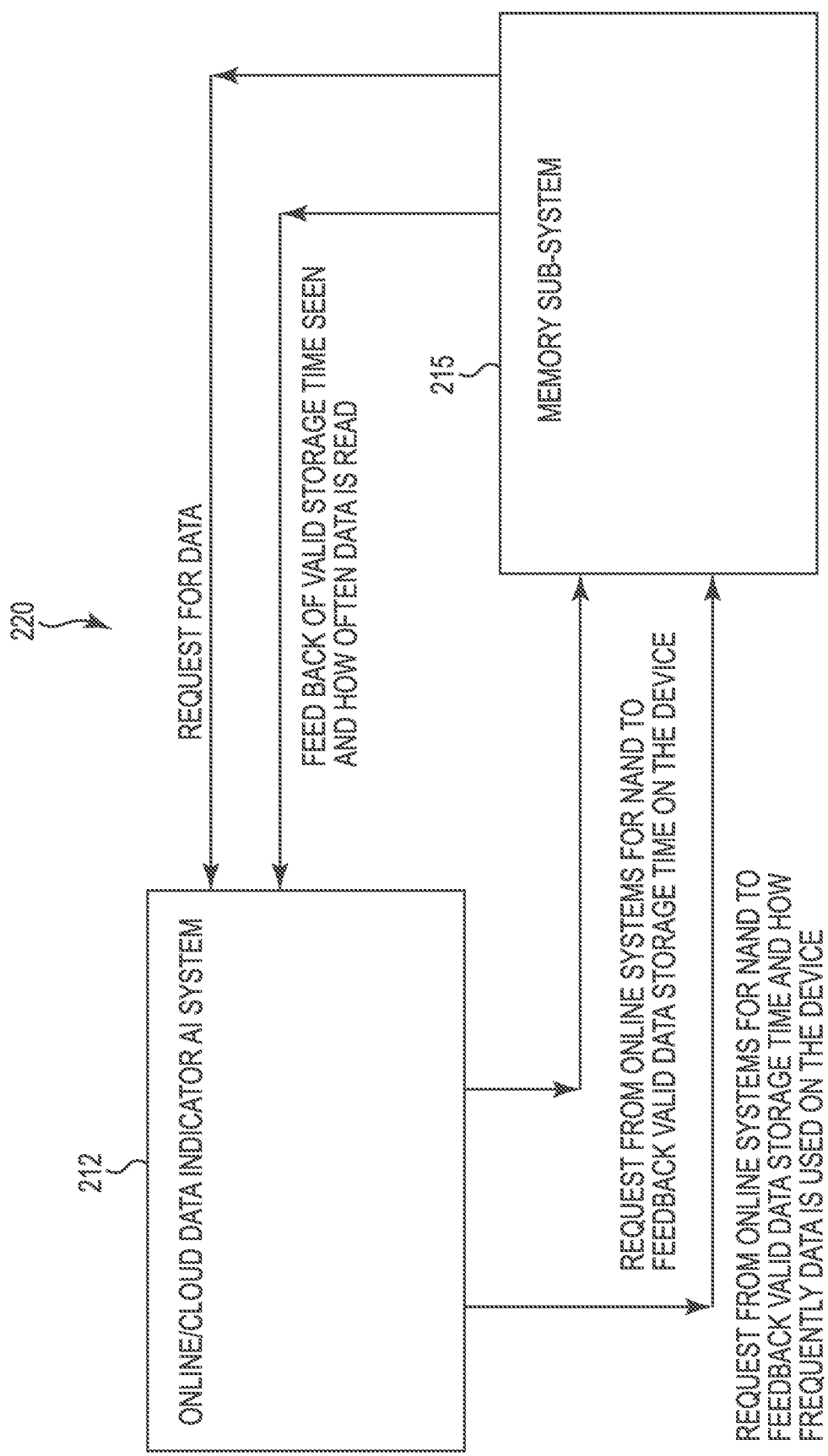
FIG. 2 illustrates a block diagram of a cloud system for organizing data in accordance with a number of embodiments of the present disclosure.

FIG. 2 illustrates a block diagram of a cloud system 220 for organizing data in accordance with a number of embodiments of the present disclosure. The cloud system 220 includes an AI system 212 and a memory sub-system 215. The AI system 212 can be coupled to the memory sub-system 215 through a host and/or a network, for example. In various instances, the AI system 212 can implement an ANN.

In various instances, the AI system 212 receive an input and, based on the input, can generate an output that can be used to organize a data file in the memory sub-system 215. For example, the AI system 212 can receive, as an input, file metadata corresponding to a data file and device metadata corresponding to the memory sub-system 215 and/or a memory device of the memory sub-system 215.

The file metadata can include a data type of the data file, a size of the data file, and/or an expected us of the data file in the memory sub-system 215. A data type of the data file can be, for example, a "pdf" type, a "gif" type, and/or an "mp4" type, among other possible types. The data type can also be a video type and/or a picture type, among other types. In various instances, the data type can be generated from an identifier of the data file. For example, the identifier of the data file can end with an extension. The extension can be used to assign a data type to the data file. It is expected that data files that share a type are likely to be stored for a similar duration of time and may be accessed a similar quantity of times.

An expected us of the data file in the memory sub-system 215 can describe how the data file is expected to be used by the memory sub-system 215. For example, possible uses of the data file by the memory sub-system 215 can influence a duration of time for which the data file is stored by the memory sub-system and/or a quantity of times the data file is expected to be read during the duration of time. For instance, if the previous X data files having a same data type and stored by the memory device 215 are deleted immediately after being stored, then a next data file having the same data type will have an expected use on the memory sub-system 215 that is consistent with being deleted immediately after being stored.

The device metadata can include a use case of the memory sub-system 215, a size of the memory sub-system 215, and/or an expected use of the data file in the memory sub-system 215. The use of the memory sub-system 215 can describe how the memory sub-system 215 is being used at the time the data file is received by the memory device 215. For instance, if the memory sub-system 215 is being used to stream video, then the use of the memory sub-system 215 can impact the duration of time a data file is stored by the memory sub-system 215 and a quantity of times the data file is read. A size of the memory sub-system 215 can include a total size of the memory sub-system 215, a total size of a memory device of the memory sub-system 215, and/or an available size of the memory sub-system 215.

The AI system 212 can output a data use rating based on the input. That is, the AI system 212 can utilize the device metadata and/or the file metadata to generate the data use rating. The data use rating can be provided to the memory sub-system 215 in the form of additional device metadata and/or file metadata that can be used by the memory sub-system 215 to determine a storage location of the corresponding file. As such, the AI system 212 can analyze the device metadata and/or the file metadata to generate the data use rating. The data use rating can describe an expected use of the data file in the memory sub-system 215. The data use rating can be generated by the AI system 212. The data use rating can include a number of indicator bits or bytes. The data use rating can describe an expected duration of time the data file will be stored by the memory sub-system 215 and/or a quantity of time the data file will be read during the expected duration of time. As an example, a pair of bits can be used to represent four different data use ratings. For instance, a first data use rating (e.g., 00) can correspond to the data file being stored less than two hours, a second data use rating (e.g., 01) can correspond to the data file being stored between two hours and twenty four hours, a third data use rating (e.g., 10) can correspond to the data file being stored between twenty four hours and five days, and a fourth data use rating (e.g., 11) can correspond to the data file being stored between five days and thirty days.

The data use rating can be provided to the memory sub-system 215. The memory sub-system 215 can receive the data file and the data use rating. The memory sub-system 215 can store the data file in a same block that stores different data files having the same data use rating. That is, the data files in the memory sub-system 215 can be organized based on the data use rating such that data files having a same data use rating are stored in a same block of the memory sub-system 215.

Storing data files that share a same data use rating in a same block can result in the data files expiring at substantially the same time. Storing data files that share a same data use rating in a same block can result in garbage collection operations being performed on the data files at substantially the same time. As used herein, the term "substantially" describes a measurement being within a delta of a standard. For example, a duration of time a data file is stored can be between two hours and twenty four hours. Storing data files that share a same data use rating in a same block can result in read recovery operations being performed on the data files at substantially the same time.

The AI system 212 can also be trained. The AI system 212 can request feedback from the memory sub-system 215. The feedback requested can include a duration of time (e.g., data storage time on the device) the data file was actually stored by the memory sub-system 215 and/or a quantity of times the data file is read. Reading a data file can also be considered using the data file. Accordingly, the feedback request can include a request for a frequency of use of the data by the memory sub-system 215.

The memory sub-system 215 can track the duration of time the data file is stored and the quantity of times the data file is read. Responsive to receipt of the request for feedback, the memory sub-system 215 can provide the feedback comprising a duration of time the data file is stored and a quantity of times the data file is read.

The memory sub-system 215 can provide the file metadata and the device metadata (e.g., request for data) to the AI system 212. The file metadata and the device metadata can be used by the AI system 212 to identify a particular case. The feedback can be used by the AI system 212 to determine whether a correct prediction was made. For example, the AI system 212 can compare the duration of time (e.g., actual duration of time) the data was stored in the memory sub-system 215 and the quantity (e.g., actual quantity of accesses) of times the data file was read with an output (e.g., projected duration of time and projected quantity of accesses) generated using the file metadata and the device metadata. If the actual duration of time and the actual quantity of access is within a delta of the projected duration of time and the projected quantity of accesses, then the AI system 212 can determine that the output is correct and can update the weights and biases of the ANN to reflect the same. If the actual duration of time and the actual quantity of access is not within a delta of the projected duration of time and the projected quantity of accesses, then the AI system 212 can determine that the output is not correct and can update the weights and biases of the ANN to reflect the same. That is, the AI system 212 can train the ANN utilizing the file metadata, the device metadata, and the actual duration of time and the actual quantity of accesses.

The training of the ANN can take place with a particular sample of data files stored by the memory sub-system 215. In various instances, the AI system 212 can mark data files that are to be used for training so that the memory sub-system 215 does not have the burden of tracking a duration of time the data file is stored and a quantity of accesses of the data file for every data file that the memory sub-system 215 stores.

Figure 3:
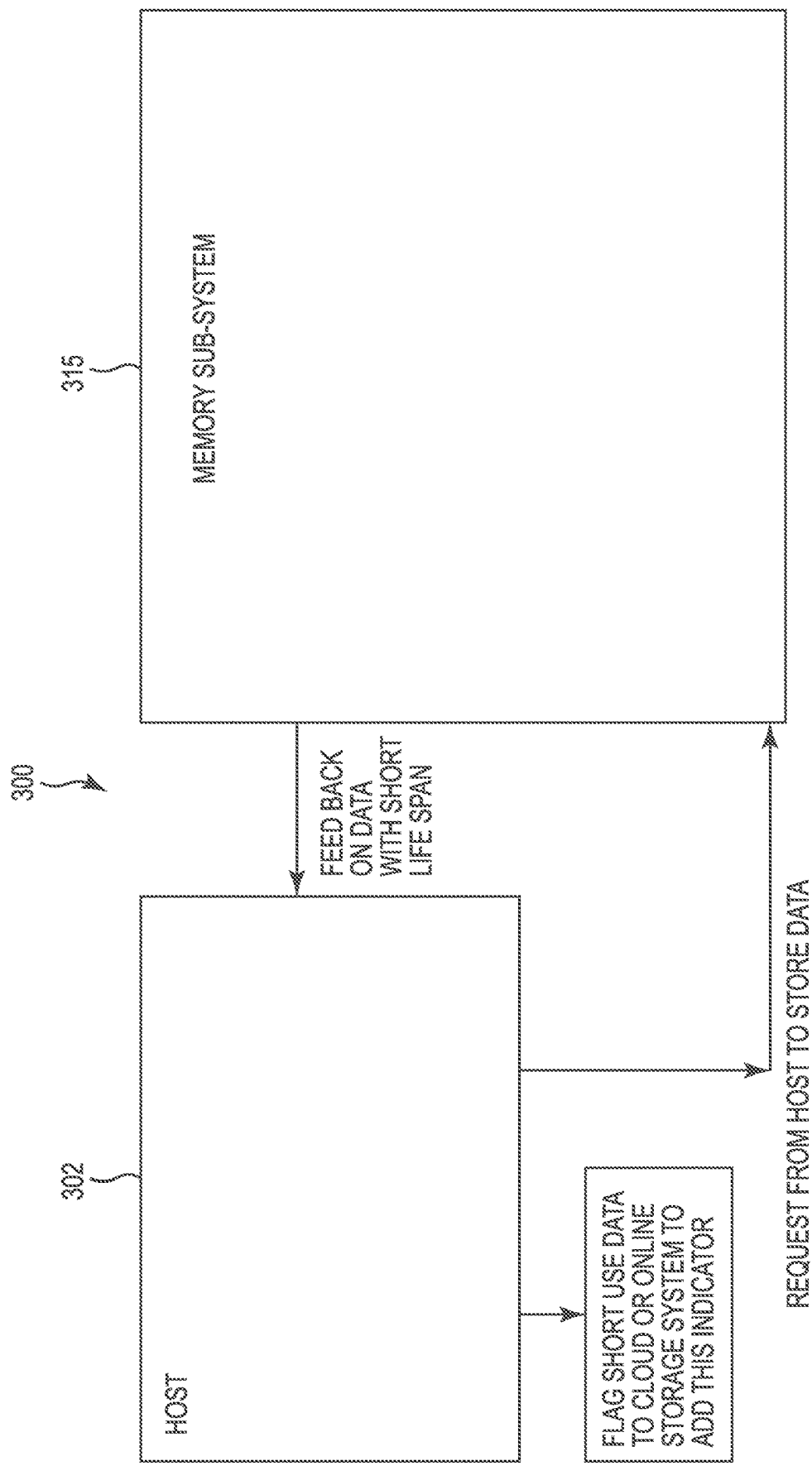
FIG. 3 illustrates a block diagram of a computing system for organizing data in accordance with a number of embodiments of the present disclosure.

FIG. 3 illustrates a block diagram of a computing system 300 for organizing data in accordance with a number of embodiments of the present disclosure. The computing system 300 can include a host 302 and a memory sub-system 315.

The host 302 can receive and/or access a data file. The host 302 can generate metadata for the data file. For example, the host 302 can generate an extension for the data file and/or can generate a size of the data file. The extension for the data file and/or the size of the data file can be used to generate a type of the data file or a category of the data file. The host 302 can provide the extension, the size, type, and/or category of the data file to the memory sub-system 315. The host 302 can also provide the data file to the memory sub-system 315 and a request to store the data file.

The memory sub-system 315 can receive the file metadata (e.g., data file extension, data file size, data file type, and/or data file category) and the file. The memory sub-system 315 can generate the data use rating by utilizing the file metadata and/or device metadata 315. The memory sub-system 315 can generate its own device metadata. For example, the memory sub-system 315 can generate metadata for itself and/or metadata for memory devices (e.g., memory devices 103 in FIG. 1) that the memory sub-system 315 hosts.

In various examples, the memory sub-system 315 can generate the data use rating utilizing an AI accelerator such as AI accelerator 114 of FIG. 1. The memory sub-system 315 can also generate the data use rating utilizing the data organization circuitry 119 of FIG. 1. The memory sub-system 315 can also generate the data use rating utilizing the data organization circuitry 119 and the AI accelerator 114.

Based on the data use rating, the memory sub-system 315 can store the data file in a region of the memory devices of the memory sub-system. The region of the memory sub-system 315 can include a plurality of memory devices, a memory device, and/or a block of the memory device, among other possible segmentations of the memory sub-system 315.

The memory sub-system 315 can segment the memory devices such that each region of the memory sub-system 315 only stores data files that share a data use rating. The memory sub-system 315 can create a different segmentation of the memory devices each time the memory sub-system 315 determines a different data use rating is needed. For example, the memory sub-system 315 can generate a first segmentation for a first data use rating. The memory sub-system 315 can generate a second segmentation once a second data use rating is needed. The memory sub-system 315 can generate a third segmentation once a third data use rating is needed, and so forth. The segmentations can be divided from one another or can be divided from a region of unsegmented memory devices. For example, a first segmentation can include all of the available regions of the memory devices. A second segmentation can be made from the first segmentation. A third segmentation can be made from the first segmentation and/or the second segmentation. In other examples, making a first segmentation can result in the creation of an unsegmented region and the first segmentation (e.g., first region). The second segmentation can be generated from the unsegmented region such that the unsegmented region decreases in size. The third segmentation can be generated from the unsegmented region such that the unsegmented region again decreases in size.

In various instances, memory sub-system 315 can track the data file to determine whether the data file was stored in an appropriate region of the memory device. If the data file is stored in an inappropriate region of the memory device, then the memory sub-system 315 can adjust the data use rating and can store the file in an appropriate region based on the adjusted data use rating. The memory sub-system 315 can provide feedback to the host 302 indicating that the data file was stored in an inappropriate region and that the data use rating was readjusted. For example, the memory sub-system 315 can inform the host 302 that the data file having a first type was stored with data files having a second type.

The host 302 can utilize the feedback to flag the metadata corresponding to the data file. The host 302 can provide the flag to an AI system implemented on the cloud. The host 302 can attach the flag to future data files with comparable metadata to the metadata of the data file. The host 302 can provide the flag to the memory sub-system 315. The memory sub-system 315 can utilize the flag to generate a data use rating that is different from the data use rating that it otherwise would have generated for the future data files having a particular file metadata.

The host 302 can provide multiple of the flags with the file metadata and the data file. For instance, the host 302 can provide a first flag and a fourth flag. The actual data use rating generated by the memory sub-system 315 can be used in view of the flags that accompany the data file, the file metadata, and/or the device metadata.

In various instances, the host 302, the memory sub-system 315, and a cloud AI system (e.g., AI system 212 in FIG. 2) can communicate to facilitate the generating of data use ratings. For example, the cloud AI system can receive the flag provided by the host 302. The cloud AI system can utilize the flag to provide inputs to the memory sub-system 315 which can cause the memory sub-system 315 to assign data use ratings differently. For instance, the cloud AI system can provide feedback to the ANN hosted by the memory sub-system 315 to train the ANN. The feedback provided by the cloud AI system can be based on the flag provided by the memory sub-system 315 and/or flags provided by a plurality of other memory sub-systems.

Figure 4:
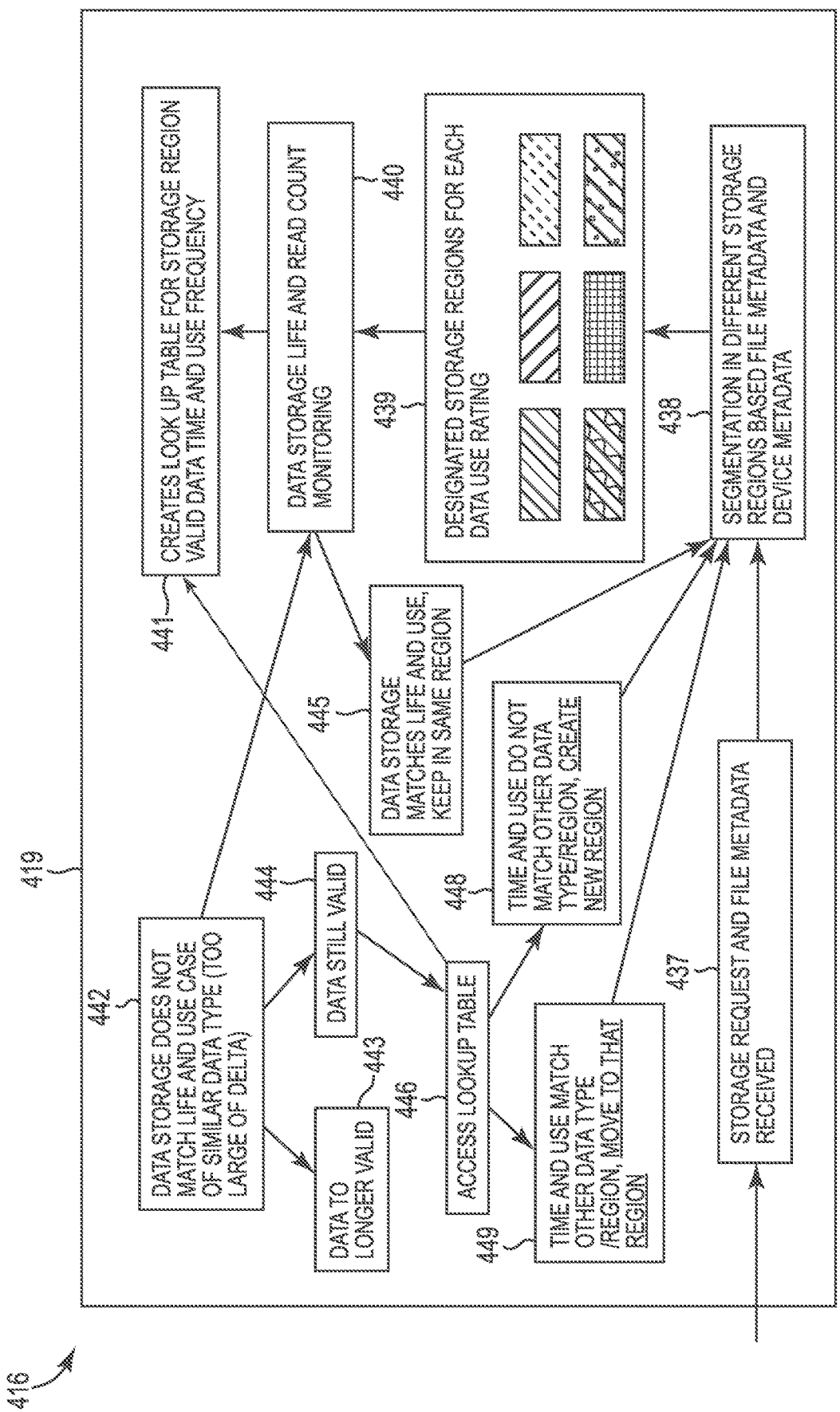
FIG. 4 illustrates an example flow diagram for organizing data in accordance with a number of embodiments of the present disclosure.

FIG. 4 illustrates an example flow diagram for organizing data in accordance with a number of embodiments of the present disclosure. The method can be performed in a number of locations. For example, the method can be performed in a host, a controller of a memory sub-system, an AI accelerator of the memory sub-system, and/or in a cloud AI system.

At block 437, a storage request and file metadata can be received. The storage request and the file metadata can be received at a controller of the memory sub-system, for example.

At block 438, the file can be stored (e.g., segmented) in a storage region based on the file metadata and/or the device metadata. Block 439 shows an example of distinct storage regions. Each of the rectangles in block 439 depict a different storage region. The storage regions do not share blocks of one or more of the memory devices of the memory sub-system. As used herein, a storage region can describe a subset of the memory cells of one or more of the memory devices. For example, a storage region can be comprised of one or more blocks of one or more of the memory devices (e.g., erase blocks of a NAND device). If a first storage region is comprised of a first block of a first memory device, then a second storage region can be comprised of a second block of the first memory device or a different block of a different memory device. In various instances, a storage region can comprise a plurality of blocks of a first memory device and a second device. Each of the storage regions can be associated with a data use rating. The file metadata can comprise a category and/or a type corresponding to the file. The segmentation of the file can be performed based on the category and/or the type of the file. As such, the file can be stored in a distinct storage region selected utilizing the category and/or the type of the file. The file can also be stored in the distinct storage region selected utilizing the category of the file, the type of the file, and/or the device metadata, for example.

A first storage region can be associated with a first data use rating and a second storage region can be associated with a second data use rating, etc. The first storage region stores data files that are assigned a first data use rating. The second storage region stores data files that are assigned a second data use rating. Accordingly, the data file can be stored in a particular region of the memory sub-system.

At block 440, a duration of time (e.g., storage life) the data file is stored in the particular region and a quantity of accesses (e.g., read count) of the data file can be monitored. At block 441, a table (e.g., look up table) can be created and/or maintained. The table can associate duration of times that data files are stored in the plurality of storage regions and a quantity of times the data files are accessed in the plurality of stored regions. For example, the table can associate the durations of times and the quantity of accesses with the plurality of storage regions utilizing the data use ratings. For instance, the table can associate a plurality of data use ratings with the plurality of storage regions.

At block 445, a determination can be made that the storage life and/or read counts of the data file match a storage life and/or read count associated with a data use rating assigned to the particular storage region. As used herein, the terms storage life and storage time are used interchangeably. Responsive to the determination made at block 445, the flow can continue to block 438.

At block 442, a determination can be made that the storage life and/or read counts of the data file do not match a storage life and/or read count associated with a data use rating assigned to the particular storage region. That is, a determination can be made as to whether the data file continues to belong in the particular storage region. For example, a determination can be made that a storage life of the data file is greater than an upper threshold of the storage life associated with the particular storage region and/or the data use rating assigned to the particular storage region.

At block 443, and responsive to determining that the data file does not belong in the particular storage region, a determination can be made that the data file is no longer valid. At block 444 a determination can be made that the data file is valid. If the data file is no longer valid, then the method can return to block 440. If the data file is valid, then at block 446 the look up table can be referenced (e.g., access lookup table) to determine whether the data file should be stored in a different storage region.

At block 449, a determination can be made that the storage life and/or read counts of the data file match a storage life and/or read count associated with a different storage region. For example, a new data use rating can be generated for the data file responsive to which a determination can be made as to whether the different storage region is associated with the new data use rating. If the different storage region associated with the new data use rating exists, then the data file can be moved to the different storage region associated with the new data use rating. Moving the data file can include deleting data file from the storage region and storing the data file in the different storage region.

At block 448, a determination can be made that the storage life and/or read counts of the data file do not match an existing storage region responsive to which a new storage region can be created. For example, a determination can be made that the new data use rating is not associated with an existing storage region responsive to which a new storage region can be created. The new storage region can be associated with the new data use rating. The method can continue to block 438.

Figure 5:
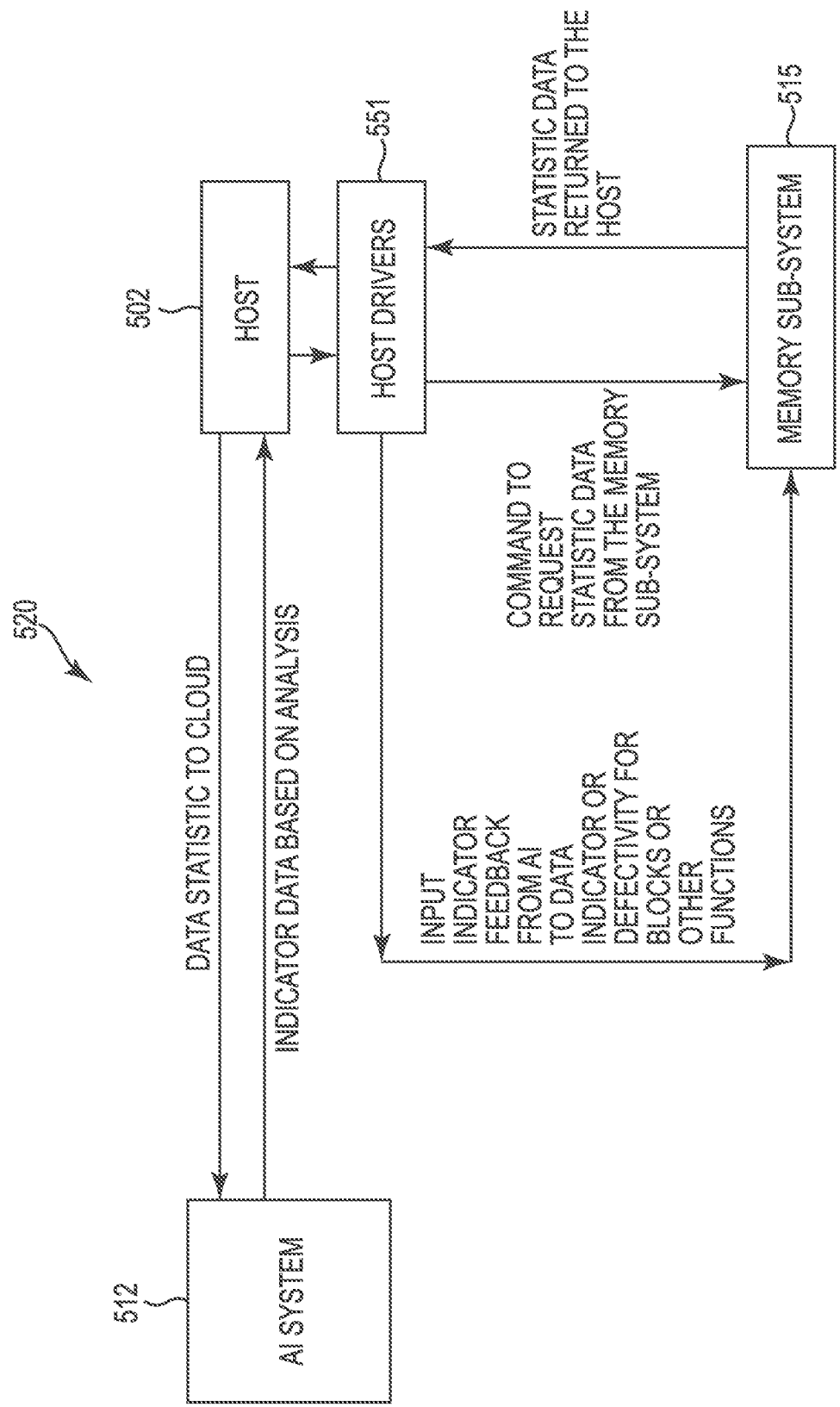
FIG. 5 illustrates a block diagram for reporting through a host for cloud processing in accordance with a number of embodiments of the present disclosure.

FIG. 5 illustrates a block diagram for reporting through a host 502 for cloud processing in accordance with a number of embodiments of the present disclosure. FIG. 5 shows a cloud system 520 including a host 502, host drivers 551, a memory sub-system 515, and an AI system 512. As used herein, the host driver 551 is software interface that provides access to the host 502 which is a hardware device. The cloud system 520 facilitates communication between the AI system 512 and the memory sub-system 515 through the host 50. NAND storage solutions are limited to making decisions based on data entering a memory device and the monitoring of the memory device. Limiting the decision making to data entering a memory device places limitations on the memory device and/or the memory sub-system 515. That is, decision making can be limited by the data stored in the memory sub-system 515 given that the memory sub-system 515 may not be able to use other data to make decisions.

NAND manufacturing may also be limited in finding failures based on feedback from customers and/or internal testing that might not match all customer use cases. Additionally, there is a need for providing feedback between the cloud system 520 and the memory sub-system 515. The feedback can be used by the memory sub-system 515 and/or an AI system 512 of the cloud system 520 to optimize the function of the memory sub-system 515.

Providing the ability to communicate between the memory sub-system 515 and the AI system 512 allows for the memory sub-system 515 to be optimized utilizing the feedback provided by the AI system 512. Allowing for feedback between the memory sub-system 515 and the AI system 512 provides for the manufacturing processes to screen materials live in the field. The examples described herein provide the ability to utilize multiple data sets (e.g., feedback) provided from multiple devices (e.g., host 502 and/or the AI system 512) to make decisions by the memory sub-system 515.

The examples of FIG. 5 provide an option to allow the system on chip (e.g., host 502) to upload statistics on stored data and/or data about the performance of the memory sub-system 515 or defects of the memory sub-system 515 to an AI system 512 hosted by a cloud system 520 to perform analysis through AI or other methods. The examples described herein allow for communication between the memory sub-system 515 and the host driver 551, between the host driver 551 and the host 502, and/or between the host 502 and the AI system 512.

The AI system 512 can provide indicator data based on statistics provided to the AI system 512. The host 502 can receive the indicator data. The host 502, via the host drivers 551, can provide the indicator data to the memory sub-system 515. The input indicator feedback can be used by the memory sub-system 515 to optimize the memory sub-system 515. For example, the input indicator feedback can be used to resolve defective blocks, among other operations.

The host drivers 551 can also request statistic data from the memory sub-system 515. The memory sub-system 515 can responds to the request by providing statistic data to the host drivers 551. The statistic data can be data that provides attributes of the memory sub-system 515. The statistic data can also be referred to metadata (e.g., device metadata, and/or file metadata) provided form the memory sub-system 515 to the AI system 512. The host drivers 551 can provide the statistic data provided by the memory sub-system 515 to the host 502. The host 502 can provide the statistic data to the AI system 512. The AI system 512 can use the statistic data to generate indicator data for the memory sub-system 515. That is the AI system 512 can analyze the statistic data to generate the indicator data. In various instances, the AI system 512 can receive the data file instead of the statistic data. The AI system 512 can analyze the data file to generate the indicator data.

Figure 6:
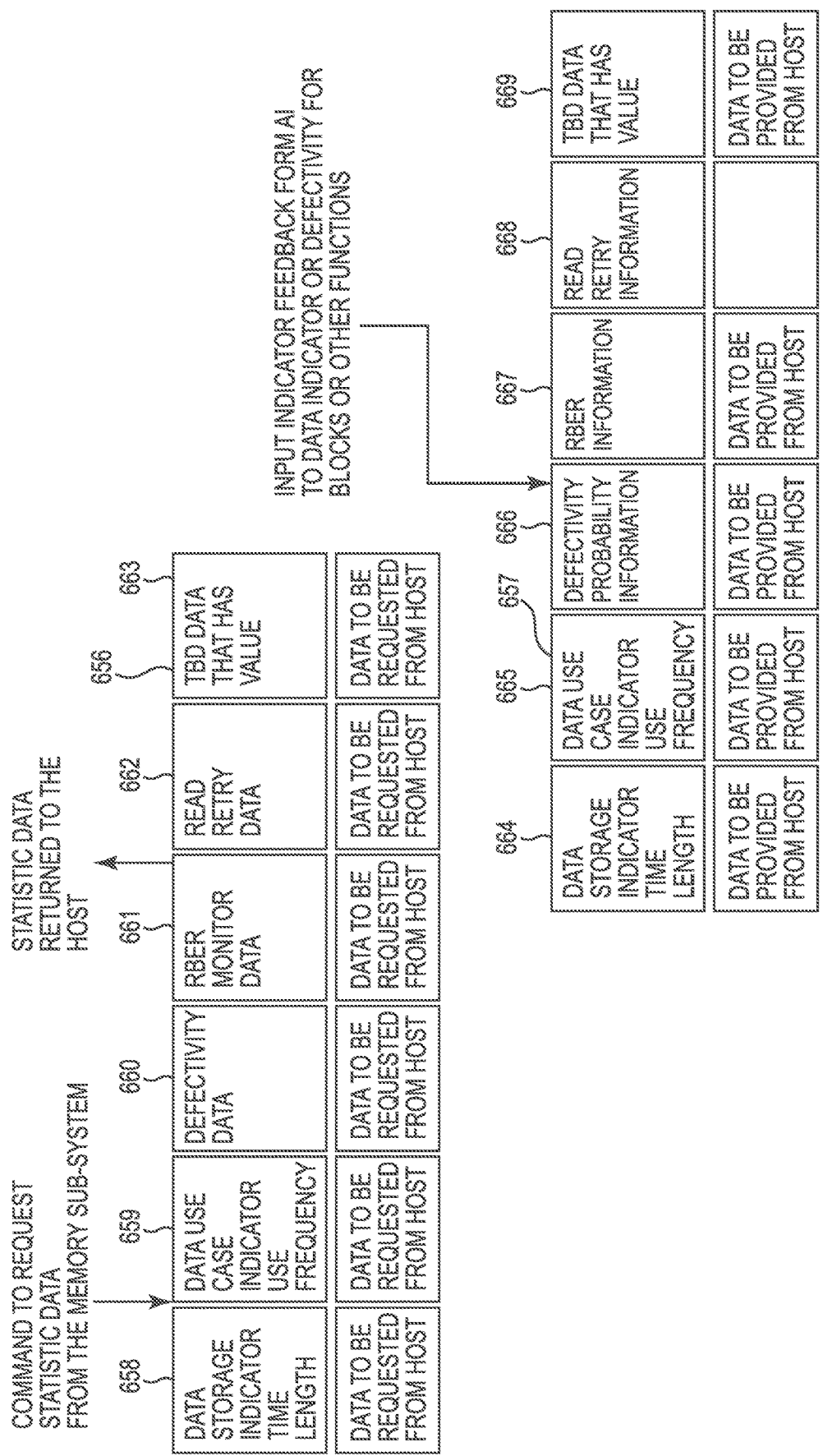
FIG. 6 illustrates a block diagram of data bytes in accordance with a number of embodiments of the present disclosure.

FIG. 6 illustrates a block diagram of data bytes in accordance with a number of embodiments of the present disclosure. FIG. 6 shows the frame structure 656 for commands to request statistic data provided from the host through host drivers and for the memory sub-system and for returning statistic data from the memory sub-system to the host through the host driver. FIG. 6 also shows the frame structure 657 for providing input indicator feedback from the AI system 512 to the memory sub-system 515 through the host 502 and the host drivers 551 of FIG. 5.

The frame structure 656 can include a plurality of fields 658, 659, 660, 661, 662, 663. The field 658 can provide a data storage indicator time length (e.g., a duration of time the data file is stored/storage time). The field 659 can provide a data use case indicator use frequency (e.g., a quantity of times a data file is accessed/read count). The field 660 can provide defectivity data which describes information regarding a defectivity experiences by a corresponding memory sub-system and/or memory device. The field 661 can provide a raw bit-error rate. The field 662 can provide read retry data. The field 663 can be reserved for additional data, as needed. The frame structure 656 can be used to request statistics from the memory sub-system and/or to provide the statistics from the memory sub-system to the host.

The frame structure 657 can include a plurality of fields 664, 665, 666, 667, 668, 669. The field 664 can provide a data storage indicator time length (e.g., a duration of time the data file is stored/storage time). The field 665 can provide a data use case indicator use frequency (e.g., a quantity of times a data file is accessed/read count). The field 666 can provide defectivity data which describes information regarding a defectivity experiences by a corresponding memory sub-system and/or memory device. The field 667 can provide a raw bit-error rate. The field 668 can provide read retry data. The field 669 can be reserved for additional data, as needed. The frame structure 657 can be used to provide the input indicator feedback from the AI system to the memory sub-system.

Figure 7:
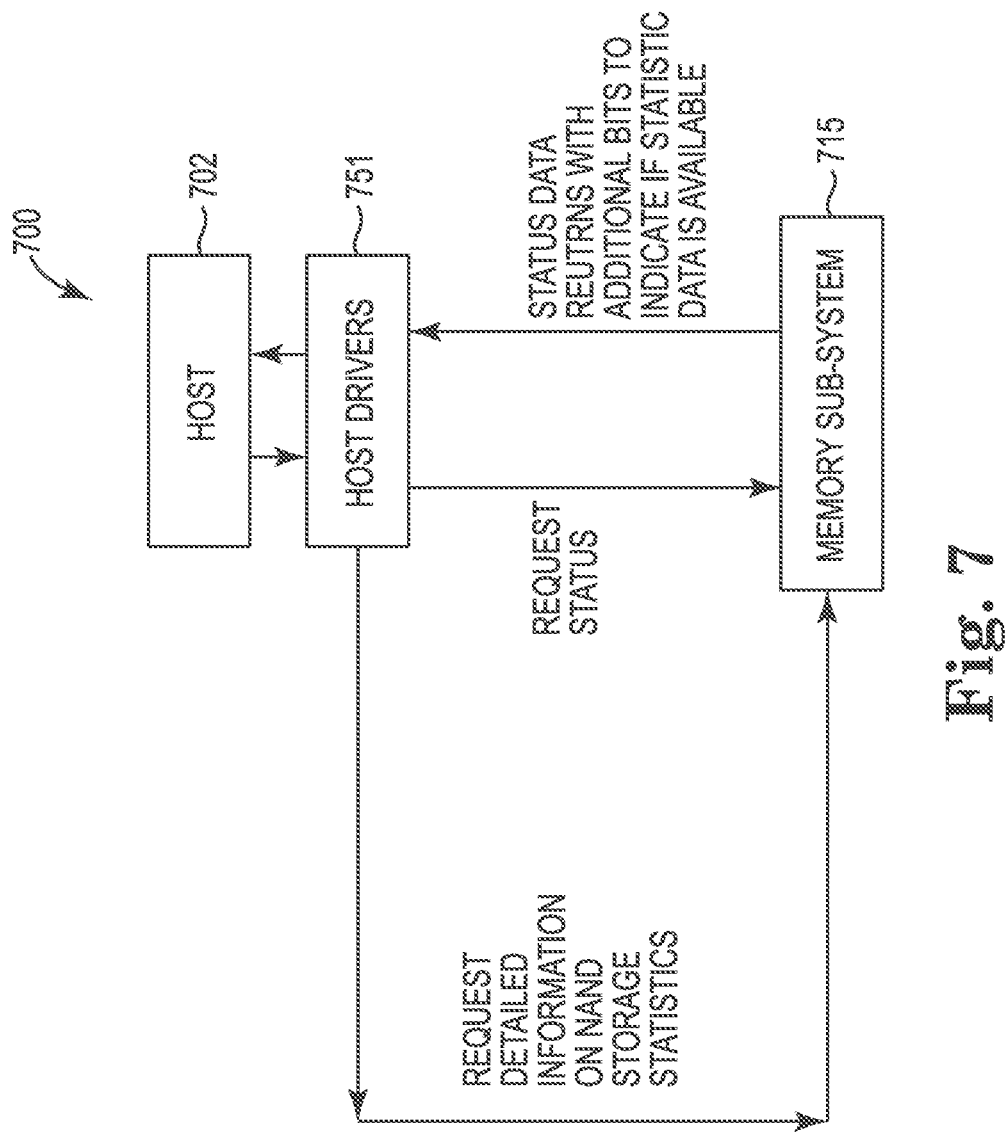
FIG. 7 illustrates a block diagram for reporting to a host from a memory sub-system in accordance with a number of embodiments of the present disclosure.

FIG. 7 illustrates a block diagram for reporting to a host from a memory sub-system in accordance with a number of embodiments of the present disclosure. FIG. 7 includes the host 702, the host drivers 751, and the memory sub-system 715.

The host 702 can request detailed information on storage statistics for the memory sub-system 715. The memory sub-system can provide the status data. The statis data can be returned with additional bits to indicate if statistic data is available. The host 702 can also request a status of the memory sub-system 715 utilizing the host driver 751.

Figure 8:
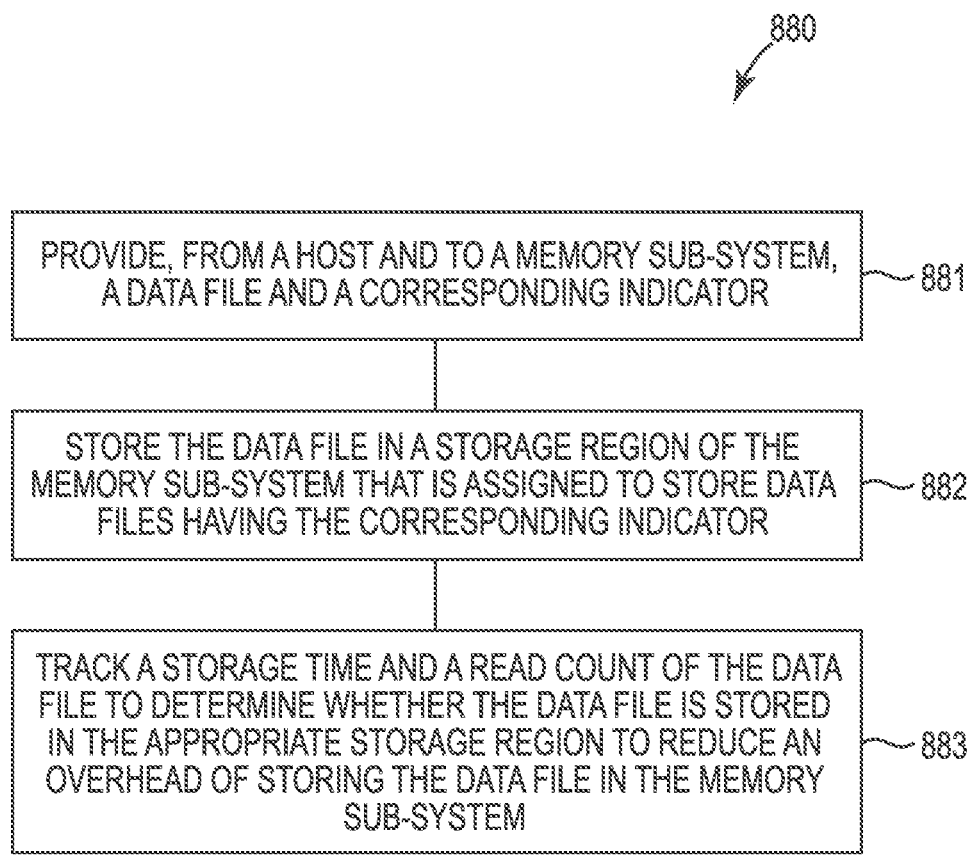
FIG. 8 illustrates an example flow diagram of a method for storing data for garbage collection in accordance with a number of embodiments of the present disclosure.

FIG. 8 illustrates an example flow diagram of a method 880 for storing data for garbage collection in accordance with a number of embodiments of the present disclosure. The method 880 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 880 is performed by the control circuitry (e.g., controller) 116 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 881, a data file and a corresponding indicator can be provided from a host and to a memory sub-system. At block 882, the data file can be stored in a storage region of the memory sub-system that is assigned to store data files having the corresponding indicator. At block 883, a storage life and a read count of the data file can be tracked to determine whether the data file is stored in the appropriate storage region to reduce an overhead of storing the data file in the memory sub-system. The overhead can include, for example, performing garbage collection on the in the appropriate storage region.

Garbage collection can be performed on the data files stored in the storage region of the memory sub-system at a same time. That is, garbage collection operations can be performed on a number of blocks of memory cells that comprise the storage region. The garbage collection operations can be performed without interruption. The garbage collection operations can be performed to perform garbage collection on the block collectively.

The method 880 can also include determining whether the storage life and the read count of the data file matches a storage life and a read count of the data files stored in the storage region of the memory sub-system. Responsive to determining that the storage life and the read count of the data file matches the storage life and the read count of the data files, the data file can be retained in the storage region. Responsive to determining that the storage life and the read count of the data file does not match the storage life and the read count of the data files and that the data file is valid, a determination can be made as to whether the storage life and the read count of the data file matches the storage life and read count of a different storage region. Responsive to determining that the storage life and the read count of the data file matches the storage life and read count of a different storage region, the data file can be moved to the different storage region. Responsive to determining that the storage life and the read count of the data file does not match the storage life and read count of a different storage region, a new storage region of the memory sub-system can be defined, and the data file can be moved to the new storage region.

In a number of examples, file metadata of a data file and device metadata of the memory device can be received. The file metadata and the device metadata can be received at an AI accelerator, for example. Based on the file metadata and the device metadata, a number of indicators can be selected to provide an indication of an expected use of the data file in the memory device. The number of indicators can be provided to the memory device. The memory device can receive the data file and the number of indicators and store the data file with different data files having matching indicators corresponding thereto. The memory device can perform a garbage collection operation on the data file and the different data files.

An AI accelerator can receive a type of the data file which can comprise file metadata. A size of the data file can also be received as file metadata. Metadata of a computing system hosting the memory device can be received as device metadata. A size of the memory device can also be device metadata. A use of the memory device can further comprise device metadata. A use of the memory device can include a description of how the memory device is being used. As such, the AI accelerator can receive a description of how the memory device is being used. For instance, the memory device can be used to stream data or the memory device can be used to store system library files.

The number of indicators that represent a use indicator from a plurality of use indicators can be selected, wherein the plurality of use indicators represents a plurality of different uses of the data file by the memory device. The data file can be stored to a physical block that is also used to store the different data files, wherein the physical block stores data that is assigned the number of indicator bits. The method can also include performing garbage collection on data stored in the physical block, including the data file and the different data files, at a same time.

The AI accelerator can request feedback on the storage latency of the data file and the quantity of times the data file was read during the storage latency. As described herein, a storage latency describes a duration of time that the data file has been stored. The storage latency can also be referred to as a storage time. An ANN can be trained using the feedback provided from the memory device to the AI accelerator, including the storage time of the data file and the quantity of times the data file was read during the storage time.

In various examples, indicator data received from a cloud system can be provided to the memory sub-system. The indicator data can be based on an analysis of a data file. Statistic data can be requested from the memory sub-system. Responsive to requesting the statistic data from the memory sub-system, the statistic data can be provided to the cloud system. The cloud system can utilize the statistic data to generate additional indicator data.

Providing the indicator data to the memory sub-system can include providing a signal comprising a first quantity of bits that describe a storage life of the data file and a second quantity of bits that describe a read count of the data file.

Requesting the statistic data from the memory sub-system can further comprise requesting a signal comprising a first quantity of bits that describe a storage life of the data file and a second quantity of bits that describe a read count of the data file.

Figure 9:
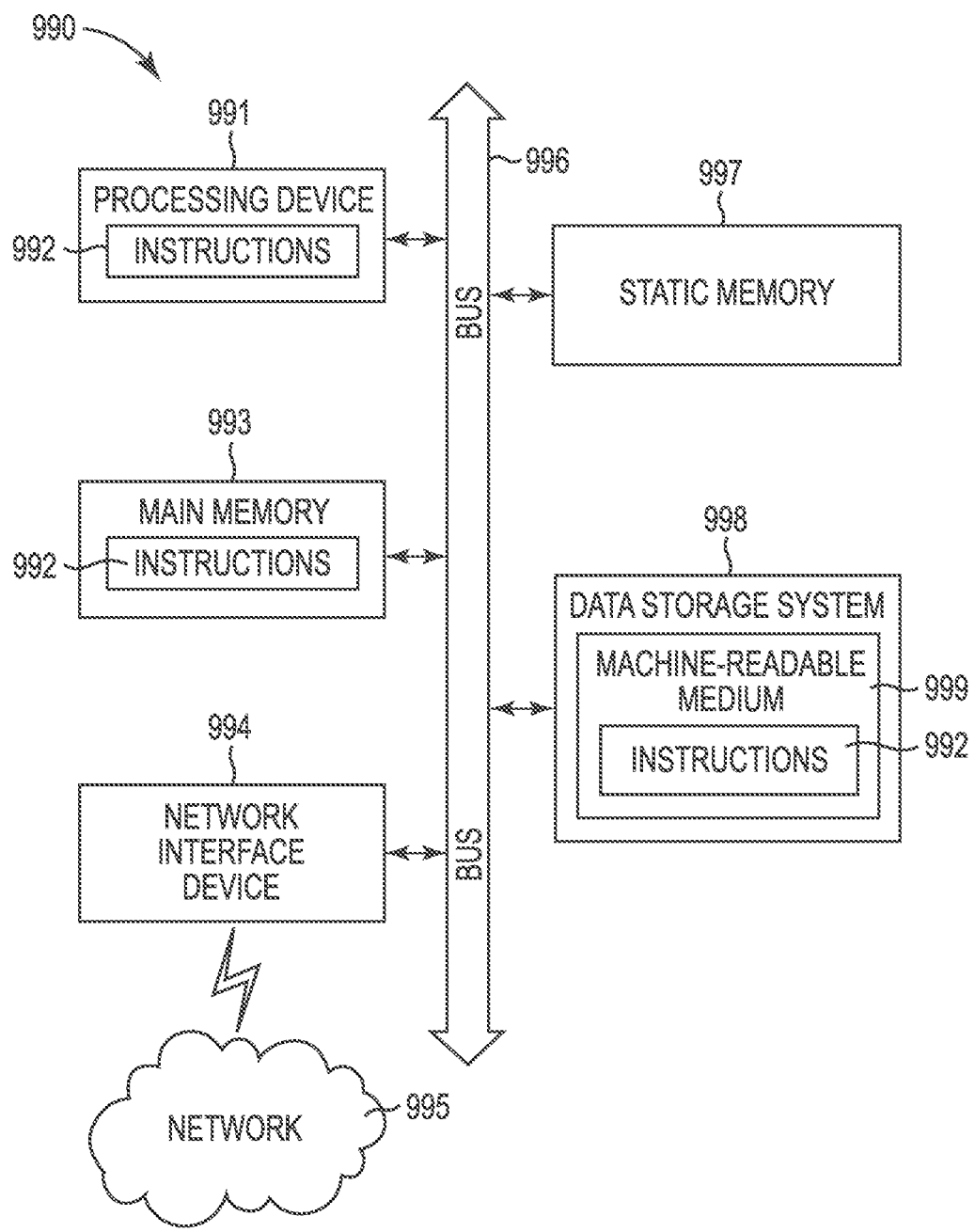
FIG. 9 illustrates an example machine of a computer system within which a set of instructions, for causing the machine to perform various methodologies discussed herein, can be executed.

FIG. 9 illustrates an example machine of a computer system 990 within which a set of instructions, for causing the machine to perform various methodologies discussed herein, can be executed. In various embodiments, the computer system 990 can correspond to a system (e.g., the computing system 100 of FIG. 1) that includes, is coupled to, or utilizes a memory sub-system (e.g., the memory sub-system 115 of FIG. 1) or can be used to perform the operations of a controller (e.g., the controller 116 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 990 includes a processing device 991, a main memory 993 (e.g., read-only memory (ROM), flash memory, dynamic random access memory (DRAM) such as synchronous DRAM (SDRAM) or Rambus DRAM (RDRAM), etc.), a static memory 997 (e.g., flash memory, static random access memory (SRAM), etc.), and a data storage system 998, which communicate with each other via a bus 996.

Processing device 991 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 991 can also be one or more special-purpose processing devices such as an application specific integrated circuit (ASIC), a field programmable gate array (FPGA), a digital signal processor (DSP), network processor, or the like. The processing device 991 is configured to execute instructions 992 for performing the operations and steps discussed herein. The computer system 990 can further include a network interface device 994 to communicate over the network 995.

The data storage system 998 can include a machine-readable storage medium 999 (also known as a computer-readable medium) on which is stored one or more sets of instructions 992 or software embodying any one or more of the methodologies or functions described herein. The instructions 992 can also reside, completely or at least partially, within the main memory 993 and/or within the processing device 991 during execution thereof by the computer system 990, the main memory 993 and the processing device 991 also constituting machine-readable storage media.

In one embodiment, the instructions 992 include instructions to implement functionality corresponding to the host 102 and/or the memory sub-system 115 of FIG. 1. While the machine-readable storage medium 999 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment.

Thus, the following claims are hereby incorporated into the Detailed Description, with each claim standing on its own as a separate embodiment.

What is claimed is:

1. An apparatus comprising:
a memory sub-system;
an AI accelerator implemented in a cloud system; and
wherein the AI accelerator is configured to:
receive a data file and device metadata of a memory device;
based on the data file and the device metadata, select a number of indicators to provide an indication of an expected use of the data file in the memory device, wherein the number of indicators include data use ratings that describe an expected duration of time the data file will be stored in the memory device and an expected quantity of times the data file will be read during the expected duration of time,
wherein the AI accelerator analyzes the data file to select the data use ratings, and
wherein the device metadata is received from the memory sub-system that includes the memory device and wherein the device metadata describes the memory sub-system and the memory device; and
provide the number of indicators to the memory device to organize a storage of the data file in the memory device such that different data files stored with the data file in a region of the memory device share a data use rating,
wherein the memory sub-system is configured to, responsive to determining that a storage life and a read count of the data file does not match a storage life and a read count of the region:
define a new region, and
move the data file to the new region.

2. The apparatus of claim 1, wherein the AI accelerator is further configured to receive a type of the data file.

3. The apparatus of claim 1, wherein the AI accelerator is further configured to receive a size of the data file.

4. The apparatus of claim 1, wherein the AI accelerator is further configured to receive metadata of a computing system hosting the memory device.

5. The apparatus of claim 1, wherein the AI accelerator is further configured to receive a size of the memory device.

6. The apparatus of claim 1, wherein the AI accelerator is further configured to receive a description of how the memory device is being used.

7. The apparatus of claim 1, wherein the AI accelerator is further configured to select the number of indicators that represent a use indicator from a plurality of use indicators, wherein the plurality of use indicators represents a plurality of different uses of the data file by the memory device.

8. The apparatus of claim 1, wherein the AI accelerator is further configured to request feedback on the storage time of the data file and the read count of the data file.

9. The apparatus of claim 8, wherein the AI accelerator is configured to train an artificial neural network (ANN) using the feedback provided from the memory device to the AI accelerator, including the storage time of the data file and the read count of the data file.

10. A method, comprising:
providing, from a host and to a memory sub-system, a data file and a corresponding indicator of an expected use of the data file in the memory device of the memory sub-system to organize a storage of the data file in the memory device,
wherein the corresponding indicator includes data use ratings that describe an expected duration of time the data file will be stored in the memory device and an expected quantity of times the data file will be read during the expected duration of time,
wherein the data file and device metadata are analyzed to select the data use ratings, and
wherein device metadata is received by the host from the memory sub-system and wherein the device metadata describes the memory sub-system and the memory device;
storing the data file with data files that share the corresponding indicator in a storage region from a plurality of storage regions of the memory device of the memory sub-system that is assigned to store data files having the corresponding indicator, wherein garbage collection operations are performed on the data files and the data filed stored in the storage region at a same time; and
tracking a storage time and a read count of the data file to determine whether the data file is stored in the appropriate storage region to reduce an overhead of storing the data file in the memory sub-system; and
responsive to determining that a storage life and a read count of the data file does not match a storage life and a read count of the different storage region:
defining a new storage region of the memory sub-system; and
moving the data file to the new storage region.

11. The method of claim 10, further comprising determining whether the storage life and the read count of the data file match a storage life and a read count of the data files stored in the storage region of the memory sub-system.

12. The method of claim 11, further comprising, responsive to determining that the storage life and the read count of the data file match the storage life and the read count of the data files, retaining the data file in the storage region.

13. The method of claim 11, further comprising, responsive to determining that the storage life and the read count of the data file does not match the storage life and the read count of the data files and that the data file is valid, determining whether the storage life and the read count of the data file matches a storage life and a read count of a different storage region.

14. The method of claim 13, further comprising, responsive to determining that the storage life and the read count of the data file matches the storage life and read count of the different storage region, moving the data file to the different storage region.

15. The method of claim 10, further comprising storing, via the memory device, the data file to a physical block that is also used to store the different data files, wherein the physical block stores data that is assigned the corresponding indicator.

16. The method of claim 15, further comprising performing, via the memory device, garbage collection on the physical block, including the data file and the different data files, at a same time.

17. A system, comprising:
a memory sub-system;
a host coupled to the memory sub-system and configured to:
provide, to the memory sub-system, indicator data received from a cloud system to organize a storage of a data file in a memory device of the memory sub-system such that the data file is stored with data files that share the indicator, wherein the indicator data includes data use ratings that describe;
   an expected duration of time the data file will be stored in the memory device, and
   an expected quantity of times the data file will be read during the expected duration of time,
wherein the data use ratings are based on an analysis of the data file and device metadata, wherein the device metadata is received from the memory sub-system and describes the memory sub-system and the memory device;
wherein the indicator data is an indicator of an expected use of the data file in the memory device of the memory sub-system; and
wherein overhead operation are performed on different data files and the data file stored in a region of the memory sub-system at a same time;
request statistic data from the memory sub-system; and
provide the statistic data to the cloud system, wherein the cloud system utilizes the statistic data to generate additional indicator data; and wherein the memory device is further configured to responsive to determining that a storage life and a read count of the data file does not match a storage life and a read count of the region:
   define a new region, and
   move the data file to the new region.

18. The system of claim 17, wherein the host configured to provide the indicator data to the memory sub-system is further configured to:
provide a signal comprising:
   a first quantity of bits that describe the expected duration of time, and
   a second quantity of bits that describe the expected quantity of times the data file will be read during the expected duration of time.

19. The system of claim 17, wherein the host configured to request the statistic data from the memory sub-system is further configured to request a signal comprising:
   a first quantity of bits that describe the storage life of the data file, and
   a second quantity of bits that describe the read count of the data file.

\* \* \* \* \*